United States Patent [19]
Crisci

[11] Patent Number: 6,040,764
[45] Date of Patent: Mar. 21, 2000

[54] BICYCLE COVER WITH AN ATTACHABLE ALARM SYSTEM

[76] Inventor: Frances E. Crisci, 1828 Sweeney Ave., Las Vegas, Nev. 89104

[21] Appl. No.: 09/057,858

[22] Filed: Apr. 9, 1998

[51] Int. Cl.[7] .................................................. B25R 25/10
[52] U.S. Cl. .................. 340/432; 340/426; 340/427; 340/571; 340/309.15; 70/57.1; 70/233; 280/297
[58] Field of Search .................... 340/427, 426, 340/432, 571, 309.15, 693; 70/57.1, 233; 180/282, 287; 280/297; 150/167

[56] References Cited

U.S. PATENT DOCUMENTS

| | | | |
|---|---|---|---|
| 3,968,913 | 7/1976 | Weed et al. | 150/167 |
| 4,009,744 | 3/1977 | Joslyn | 150/167 |
| 4,274,077 | 6/1981 | Feiger | 340/426 |
| 4,356,831 | 11/1982 | Adams . | |
| 4,378,883 | 4/1983 | Profeta | 206/335 |
| 4,715,646 | 12/1987 | Goffi et al. | 296/136 |
| 4,944,340 | 7/1990 | Tortorich | 150/167 |
| 4,976,389 | 12/1990 | McLellan et al. | 224/328 |
| 4,980,667 | 12/1990 | Ames | 340/427 |
| 5,018,564 | 5/1991 | Anglin et al. | 150/167 |
| 5,023,596 | 6/1991 | Sirman et al. | 340/571 |
| 5,282,502 | 2/1994 | Ballard | 150/167 |
| 5,372,169 | 12/1994 | Norton et al. | 150/167 |
| 5,445,200 | 8/1995 | Celestino et al. | 150/167 |
| 5,562,139 | 10/1996 | Cseri | 180/167 |
| 5,612,668 | 3/1997 | Scott | 340/426 |

*Primary Examiner*—Julie Lieu
*Attorney, Agent, or Firm*—Kenneth L Tolar

[57] ABSTRACT

The present invention relates to a bicycle cover having an attachable alarm means. The cover includes a substantially elliptical bag member formed of a pair of opposing planar side panels that are peripherally joined to form a storage compartment therebetween. Sewn into the side panels are a plurality of electrically conductive cables which converge and protrude through an opening on the bag member. The external portions of the cables are intertwined and received within an elongated insulated electrical cord similar to an extension cord. The distal ends of the cables are connected to a male electrical connector on the cord which is selectively coupled with an external alarm means. The alarm means comprises a power source, a motion switch and a sound emitting means which audibly alerts a user when an unauthorized person is tampering with the bag. The cables are in communication with a second circuit including a relay and the sound emitting means for alerting a user whenever the cables are cut or the cord is disconnected from the alarm means.

6 Claims, 3 Drawing Sheets

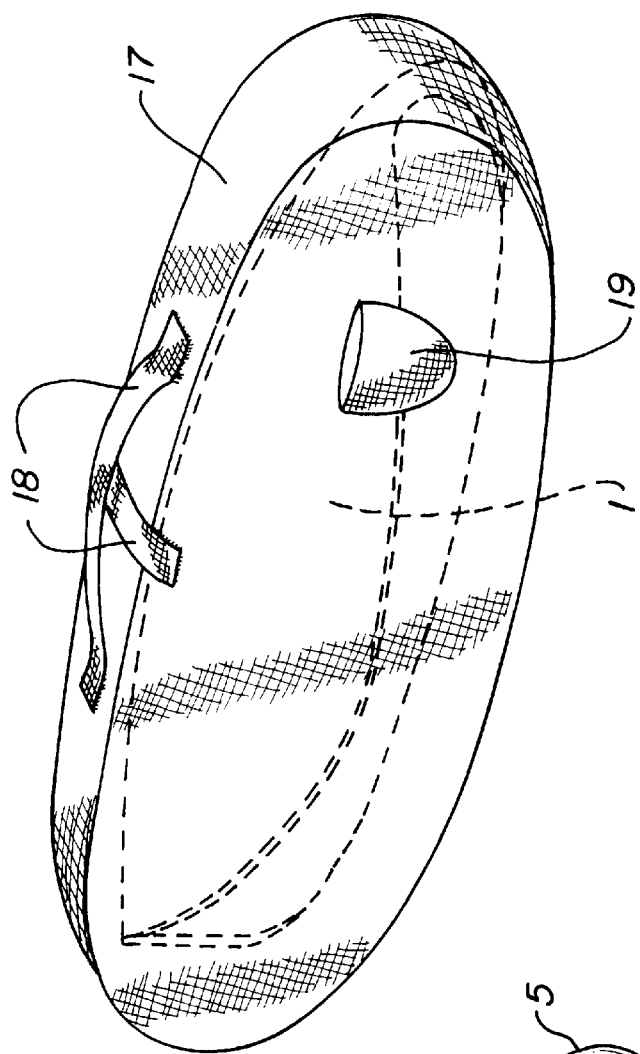
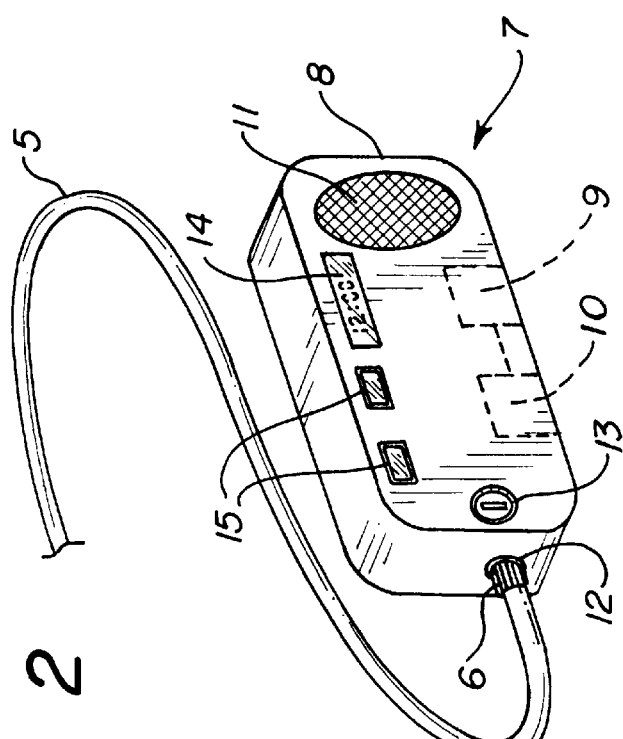

BICYCLE COVER WITH AN ATTACHABLE ALARM SYSTEM

BACKGROUND OF THE INVENTION

The present invention relates to a tamper resistant bicycle cover having an attachable alarm means for audibly alerting a user whenever the bag is manipulated by an unauthorized person.

DESCRIPTION OF THE PRIOR ART

It is often desirable to store a bicycle within a cover to protect the bicycle's brakes, gears and other components from external elements such as weather and dust. Such covers are particularly important when the bicycle is mounted to the exterior of a vehicle or is being stored in another similar outdoor location. However, whenever a bicycle is left outdoors, it is susceptible to theft or vandalism. Accordingly, there is currently a need for a bicycle cover which not only protects the bicycle from external elements such as dirt and weather but also alerts a user if an unauthorized person is tampering with the cover.

Although numerous bicycle covers and carry cases having a myriad of shapes and designs exist in the prior art, none relate to a cover having an attachable alarm means according to the present invention. For example, U.S. Pat. No. 5,282,502 issued to Ballard relates to a bicycle cover having a pair of side wall members that cover the tire portions of the bicycle and a center panel therebetween to cover the seat and handle bars.

U.S. Pat. No. 5,445,200 issued to Celestino et al relates to a unitary bicycle cover having pockets contoured to fit the bicycle seat and handle bars which are closed with hook and loop fasteners.

U.S. Pat. No. 5,018,564 issued to Anglin et al relates to a fabric protective cover for enclosing the drive mechanism of a bicycle.

U.S. Pat. No. 4,378,883 issued to Profeta relates to a bicycle carrying case comprising a pair of mating identical hinged sides with an interior chamber formed therebetween configured to hold a bicycle. When the hinged sides are joined, they form an opening at an edge for receiving a user's hand or shoulder.

U.S. Pat. No. 4,715,646 issued to Goffi et al relates to a protective covering for a bicycle comprising a bag overlapping a pair of semicircular wheel covers which slides over the top of a bicycle.

U.S. Pat. No. 4,356,831 issued to Adams relates to an envelope type cover for receiving a bicycle having upper and lower drawstrings to secure the device thereto. The cover further includes two pairs of aligned holes for receiving a locking device to secure the bicycle and cover to a rack or similar device.

Although various bicycle covers exist in the prior art, none relate to a tamper resistant device according to the present invention. The present invention provides a bicycle cover having an alarm means attachable thereto which can audibly alert a user if an unauthorized person is tampering with or manipulating the cover.

SUMMARY OF THE INVENTION

The present invention relates to a bicycle cover having an automated alarm means attachable thereto. The device includes a hollow, substantially elliptical bag member formed of two peripherally joined side panels dimensioned to receive a bicycle therein. Integral within the side panels of the bag member are a plurality of cables which protrude through an opening on its peripheral edge. The cables are intertwined and received within an elongated, insulated cord having a plug type connector at a distal end which is coupled to the distal ends of the cables. The plug type connector may be selectively connected to an external alarm means which is preferably securable to the bag member. The plug type connector is secured to the alarm means with a shunt style switch/locking mechanism that, when activated, also delivers power to the alarm means. The alarm means includes a first circuit path comprising a speaker in communication with a motion switch and a timer circuit that emits an audible warning upon the housing being manipulated. Furthermore, a second circuit path is formed by the cables, the power source, a relay and the speaker such that, if the cables are cut or the cord is disconnected from the alarm means while the system is activated, an audible alarm is emitted. A carrying case is also provided for transporting and storing the cover and alarm means when not in use. It is therefore an object of the present invention to provide a bicycle cover having an alarm means attachable thereto for alerting a person that an unauthorized user is tampering with or manipulating the bag.

It is yet another object of the present invention to provide a bicycle cover that protects a bicycle both from rain and debris as well as theft and vandalism.

It is yet another object of the present invention to provide a bicycle cover having an attachable alarm means that alerts a user if the alarm is disconnected therefrom. Other objects, features and advantages of the present invention will become readily apparent from the following detailed description of the preferred embodiment when considered with the attached drawings and the appended claims.

BRIEF DESCRIPTION OF THE DRAWINGS

FIG. 2 depicts the alarm means according to the present invention.

FIG. 3 depicts a carrying case according to the present invention.

DESCRIPTION OF THE PREFERRED EMBODIMENT

Figure 1:
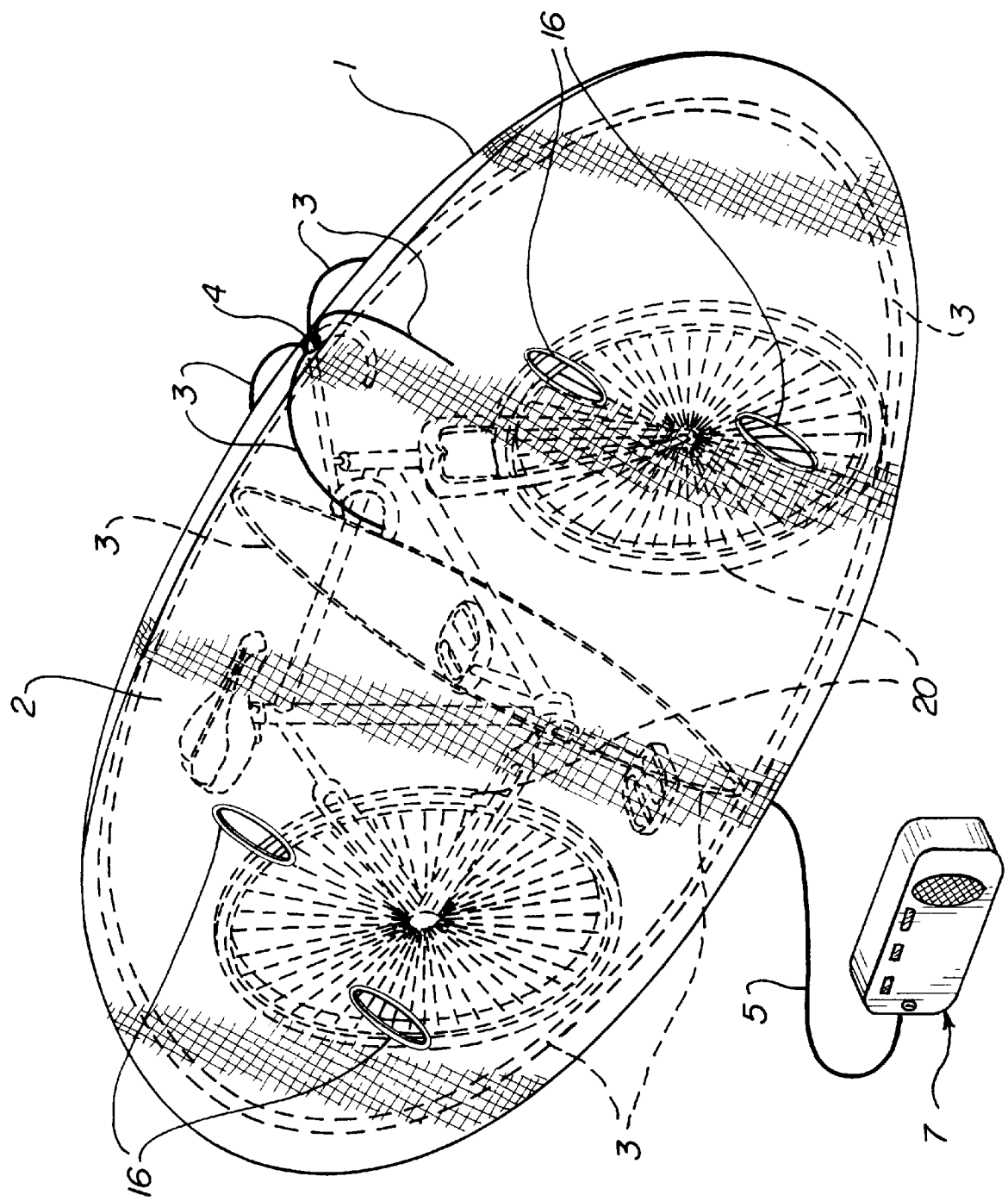
FIG. 1 depicts a bicycle in phantom received within the bag member according to the present invention.
Figure 4:
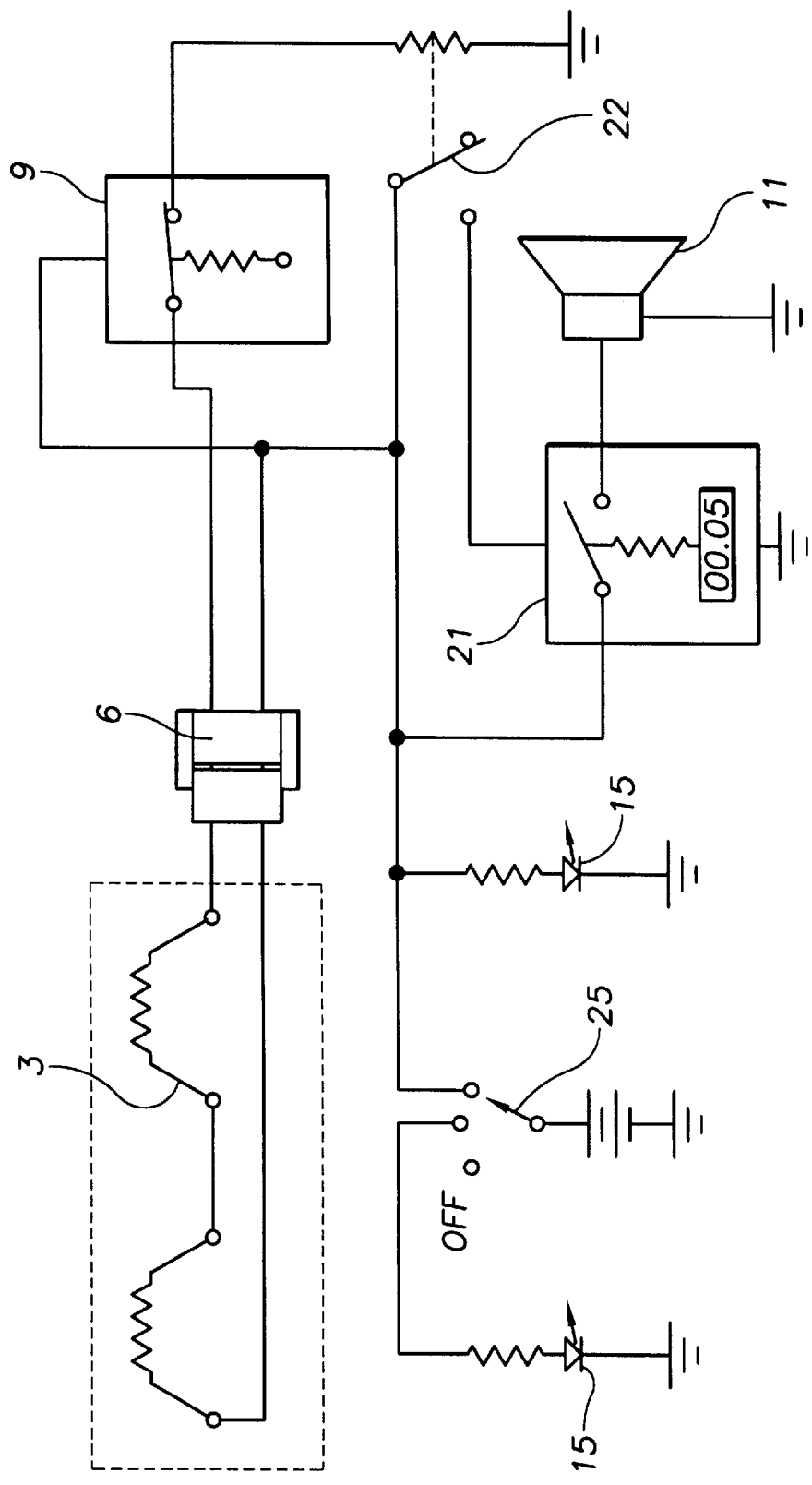
FIG. 4 depicts a schematic of the various electrical components.

Referring now to FIGS. 1 through 3, the present invention relates to a bicycle cover having an automated alarm means attachable thereto. The device comprises a hollow substantially elliptical bag member 1 having opposing planar side panels 2 that are peripherally joined to form a storage compartment therebetween. A portion of the bag member is separable through which a bicycle 20 may be inserted.

Integral with the bag member side panels are a plurality of cables 3 fabricated with a metallic, electrically conductive material. Preferably, one or more of the cables are substantially horizontal with the remaining cables 3 being vertical. However, as will be readily apparent to those skilled in the art, the configuration, number and direction of the cables may be varied without departing from the spirit of the present invention. The cables converge and protrude through a small opening 4 on the bag member. The external portions of the cables are intertwined and received within an elongated insulated cord 5 resembling a standard power cord. A distal end of the cord has a male plug type connector 6 attached thereto that is coupled with the distal ends of the cables to electrically connect the cables to an external alarm means. The male plug type connector can be of any conventional type known in the prior art used in electrical cords and similar devices. The cord also functions as a drawstring for pulling the cables to tighten the bag member around the bicycle.

The alarm means 7 comprises a small, substantially rectangular hollow housing 8 having a sound emitting means such as a speaker 11 integral with a side thereof. Received within the housing is a conventional motion switch 9 of the type generally known in the prior art for closing a circuit upon a predetermined degree of movement being applied thereto. A first circuit path is formed by the motion switch 9, a battery means 10, a countdown circuit such as a 555 timer and the speaker. If the motion switch is activated by movement, a signal is sent to the speaker which emits an audible alarm after a predetermined duration alerting a user that someone has manipulated the device.

On a side of the alarm means housing is a receptacle 12 for receiving the plug type connector. A second circuit path is thereby formed between the cables, the battery means, a relay and the speaker. A shunt style switching mechanism is received within the housing for selectively powering the first and second circuit paths. Accordingly, if the cables are cut or the cord is disconnected from the housing, the relay closes the second circuit path thereby emitting an audible alarm. Preferably, the switch is operable between an on and an off position with a key lock mechanism 13 disposed on the housing exterior. The key lock/switching mechanism may be located proximal the plug receptacle so that the plug connector may be locked into its mating receptacle to prevent an unauthorized user from disconnecting the cord.

A display screen 14 is provided on a side of the housing for visually displaying the status of the timer circuit. A pair of lights 15 are likewise disposed on a side of the housing both in communication with the switching mechanism one of which will be illuminated depending upon the position of the switching mechanism. Preferably, the alarm means housing is securable to the bag member using velcro, straps or any other conventional attachment means so that the alarm will be activated regardless of whether a person displaces the bag, the housing or both.

On each side panel of the bag member are a pair of spaced slits 16 each aligned with the corresponding slits on the opposing side panel for receiving a bunge cord, a chain or similar locking device to secure the bicycle and cover to a vehicle or a bicycle rack.

A carrying bag 17 is also provided for storing the cover and alarm means when not in use. The bag includes one or more velcro straps 18 on the exterior surface thereof which may be grasped by a user for carrying the device or securing it to an object. A pocket 19 is also provided on the exterior for receiving various accessory items.

The bag member according to the present invention is preferably manufactured with a water resistant canvas or durable nylon. The cables are preferably constructed with stainless steel or any other similar conductive material and are sewn into either or both of the side panels in a number of patterns and configurations. The alarm means housing is preferably manufactured with plastic or a similar lightweight material. The speaker and its associated circuitry may relate to a piezo buzzer or any similar equivalent. However, the various components of the alarm assembly such as the piezo buzzer, the motion switch, the countdown timer and shunt style locking switch are conventional items and are therefore not depicted nor described in extreme detail. As will be readily apparent to those skilled in the art, the size, shape and materials of construction may be varied to suit a particular application.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A bicycle cover comprising:
    a hollow fabric bag member including a storage compartment dimensioned to receive a bicycle, said bag member having an opening for removably inserting a bicycle into the compartment;
    a housing removably attachable to said bag member, said housing having an alarm means received therein for alerting a user when an unauthorized person is tampering with said bag member, said alarm means including a first circuit path including a motion switch means for detecting movement of said bag member; said motion switch means in communication with a timer and a sound emitting means for audibly signalling a user within a predetermined delay after said bag member and thus said motion switch means is manipulated;
    a second circuit path formed with a plurality of electrically conductive cables integral with said bag member and in selective communication with said sound emitting means for audibly alerting a user when said cables are disconnected therefrom;
    a display means on the exterior surface of said housing and in communication with said timer for visually indicating the status thereof.

2. A bicycle cover according to claim 1 further comprising a switch means selectively operable with a key between an on and off position for selectively delivering electricity from a power source to said first and second circuit paths.

3. A bicycle cover according to claim 1 further comprising a pair of light means on the exterior of said housing, each of said light means selectively illuminable to visually indicate the position of said switch means.

4. A bicycle cover according to claim 1 further comprising a hollow enclosable case for storing and receiving said bag member and said alarm means housing, said case having at least one strap and a pocket on the exterior thereof.

5. A bicycle cover according to claim 1 wherein said cables protrude through an opening on the bag member and are adapted to be coupled with a receptacle on the exterior of said housing, said receptacle in communication with said second circuit path.

6. A bicycle cover according to claim 1 further comprising a plurality of slits on said bag member for receiving a locking device.

* * * * *